United States Patent
Aikawa et al.

(10) Patent No.: US 6,898,751 B2
(45) Date of Patent: May 24, 2005

(54) METHOD AND SYSTEM FOR OPTIMIZING POLLING IN SYSTEMS USING NEGATIVE ACKNOWLEDGEMENT PROTOCOLS

(75) Inventors: Susan M Aikawa, Costa Mesa, CA (US); Ying Zou, Irvine, CA (US)

(73) Assignee: Transdimension, Inc., Irvine, CA (US)

(*) Notice: Subject to any disclaimer, the term of this patent is extended or adjusted under 35 U.S.C. 154(b) by 492 days.

(21) Appl. No.: 10/209,541

(22) Filed: Jul. 31, 2002

(65) Prior Publication Data

US 2004/0025099 A1 Feb. 5, 2004

(51) Int. Cl.[7] .............................................. G08C 25/02
(52) U.S. Cl. .......................... 714/748; 710/15; 710/46
(58) Field of Search ............................ 710/220, 46, 15; 714/749, 748; 702/186

(56) References Cited

U.S. PATENT DOCUMENTS

| | | | | |
|---|---|---|---|---|
| 3,665,406 A | * | 5/1972 | Gallagher et al. | 710/220 |
| 5,245,616 A | | 9/1993 | Olson | 371/32 |
| 5,566,351 A | * | 10/1996 | Crittenden et al. | 710/46 |
| 5,588,009 A | * | 12/1996 | Will | 714/749 |
| 6,311,294 B1 | | 10/2001 | Larky et al. | 714/44 |
| 6,449,663 B1 | * | 9/2002 | Carney et al. | 710/15 |
| 6,615,161 B1 | * | 9/2003 | Carney et al. | 702/186 |
| 6,640,268 B1 | * | 10/2003 | Kumar | 710/46 |

OTHER PUBLICATIONS

IBM, "Statistical Polling Method", IBM Technical Disclosure Bulletin, Jun. 1986, vol. 29, pp. 293–295.*

* cited by examiner

*Primary Examiner*—David Ton
(74) *Attorney, Agent, or Firm*—Tejinder Singh, Klein, O'Neill & Singh, LLP

(57) ABSTRACT

A process and system is provided for setting up a polling interval for a device that sends a not acknowledged (NAK) signal. The process determines the number of times the device sends a NAK signal before a successful data transfer; and also determines a statistical parameter based on the number of times the NAK signal is received before a successful data transfer; and sets a polling interval for the device based on the statistical parameter. The statistical parameter may be an average, median, maximum or minimum number of times the NAK signal is received before successful data transfer. A polling interval may also be set based upon the number times the NAK signal is received, wherein the polling interval increases with the number of NAK signals. The polling interval may double after every NAK signal.

28 Claims, 3 Drawing Sheets

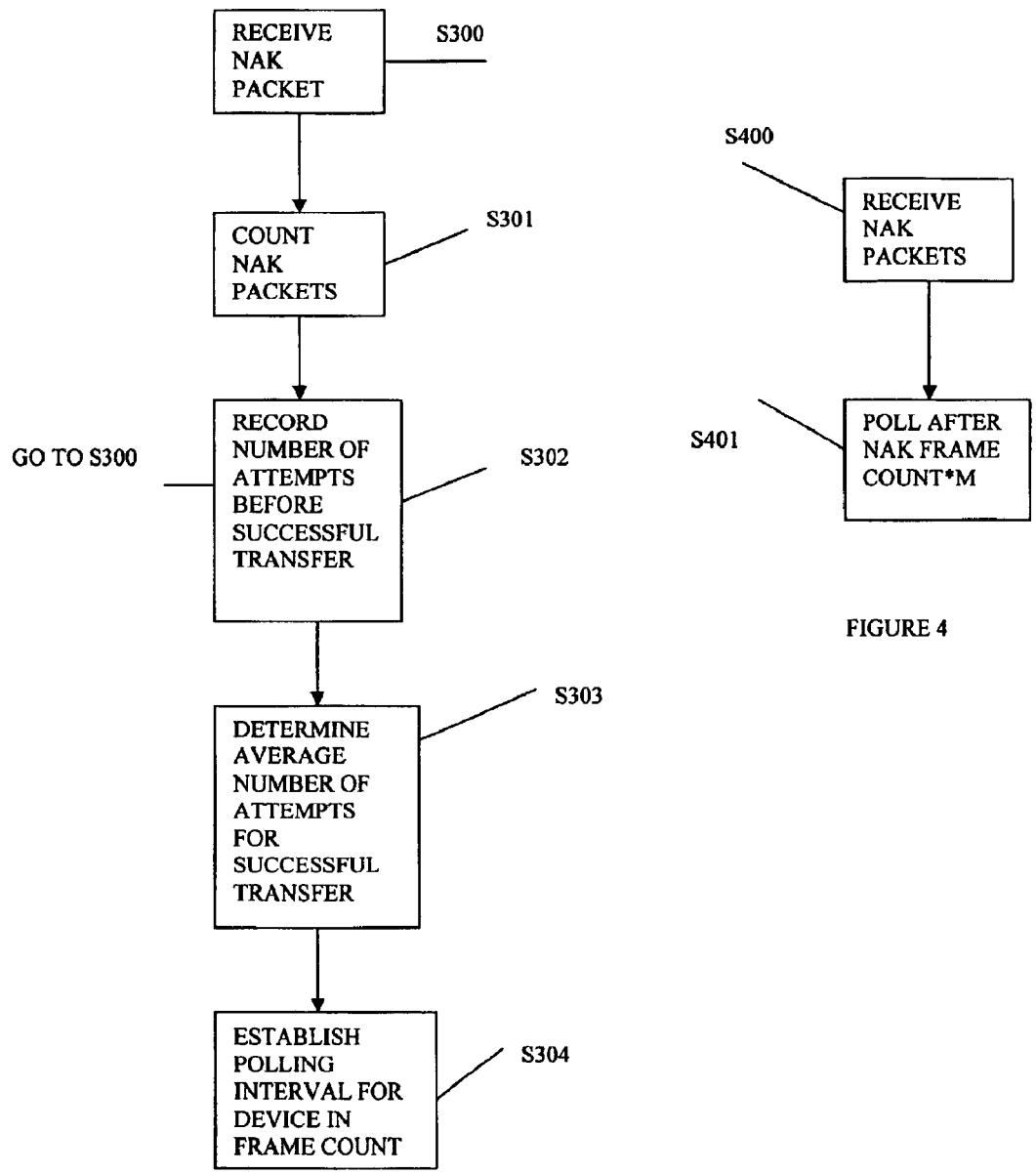

METHOD AND SYSTEM FOR OPTIMIZING POLLING IN SYSTEMS USING NEGATIVE ACKNOWLEDGEMENT PROTOCOLS

BACKGROUND OF THE INVENTION

1. Field of the Invention

The present invention relates to computing systems, and more particularly, to systems that use polling to get data and negative acknowledgement protocols.

2. Background

Various techniques are used for acknowledging data and/or message packets in communication and/or computer systems (used interchangeably herein). One such technique involves ACK (Acknowledged) and NAK (Not Acknowledged) sequencing protocols. With the ACK/NAK protocols, a receiving unit acknowledges receipt of data/message packet (the terms are used interchangeably) by sending an ACK signal/packet indicating that the packet is correctly received. A NAK signal/packet is sent to indicate that there is an error in the received data or the receiving unit is busy and cannot accept data until later time, or a transmitting device cannot transmit data.

Certain systems use a "polling" technique to receive or transfer data. Under this technique a receiving system, for example, a computer system (also referred to as host system) polls a device for data. One such system that uses the polling technique is the universal serial bus (USB) system.

The USB system provides a unitary interface that allows various devices to be connected to a host system. USB enables a wide variety of peripherals to be connected in a tree-like fashion through a physical connector at the host side. USB systems comply with the USB specifications, version 1.1 and 2.0, version 2.0 published Apr. 27, 2000, which is incorporated herein by reference in its entirety.

USB systems are implemented by a register level interface standard referred to as the "Open Host Controller Interface ("OHCI"), developed by a consortium of computer industry manufacturers. The OHCI allows multiple Host Controllers to be used with a common software driver. The OHCI specification, version 1.0a, entitled "Open HCI Host Controller Interface Specification for USB, published by Compaq, Microsoft, and National Semiconductor, Jan. 22, 1997, is incorporated herein by reference in its entirety.

Yet another standard that is used by USB systems is the Universal Host Controller Interface ("UHCI") that implements a USB Host Controller. The UHCI provides hardware and software interface between a Host Controller software driver and the Host Controller. UHCI standard published by Intel Corporation, Revision 1.1, March 1996, is incorporated herein by reference in its entirety.

Both OHCI and UHCI standards are PCI based and are mostly used in the desktop environment. Embedded applications such as cell phones, handheld devices may not run on a PCI bus. USB host controllers for embedded system are OHCI/UHCI modified since compliance to OHCI/UHCI is not required.

USB enables bi-directional isochronous and asynchronous data transfer making it possible to couple plural peripheral devices to a computing device via a single Host Controller and a USB hub. A USB hub is an intelligent wiring connector, coupled to a computing device or another hub, and which allows, attachment for peripheral devices.

USB systems allow automatic identification and configuration of external and/or internal peripheral devices. Typically, a USB host controller maintains a data structure that identifies every connected peripheral device and includes entries for communicating with the individual devices. The data structure manages four types of data transfers, between a host controller and peripheral units, namely, interrupt, isochronous, control and bulk transfers.

Interrupt transfers are periodic, small data transfers between a USB device and a client software at the host system. Isochronous transfers are periodic data transfers at a constant rate (e.g. 1 ms). Data transfer is correlated in time between a sender and receiver.

Control transfers are non-periodic data transfers used to communicate configuration/command/status information between client software and a USB device. Bulk transfers are non-periodic data transfers used to transfer large amounts of information between client software and a USB device.

OHCI/UHCI based USB systems use a microcontroller (also referred to as a host controller or USB controller), or an embedded microcontroller, uniquely suited on to a monolithic semiconductor substrate (chip) to interface between host systems and USB devices. The USB controller includes various features within a single chip, complying with the foregoing standards.

USB systems use Endpoint Descriptors (ED) and Transfer Descriptors (TD) for communication. Typically, a Host Controller Driver assigns an ED to each peripheral device or logical connection (also referred to herein as an "endpoint") in the USB system. The ED includes information necessary for the host controller to communicate with the endpoint. The fields include maximum packet size, endpoint address, and speed of the endpoint and direction of data flow. A queue of TDs is linked to the ED for a specific endpoint. The TD includes information necessary to describe the data packets to be transferred. Each TD contains information that describes one or more data packets.

Section 4 of the OHCI specification describes the use of endpoint and transfer descriptors. Typically, an ED is a 16-byte, memory resident structure. A host controller traverses lists of EDs and if there are TDs linked to an ED, the host controller performs the indicated transfer.

OHCI is a transfer based host controller. A USB host controller can be transfer based or transaction based. For transaction based, non-PCI host controller, EDs or similar representation such as QHs (queue head) are in system memory and a host controller driver traverses the ED list. The driver loads the TDs in the host controller memory for transmittal. Transfer based host controller only process TDs belong to enabled EDs unlike a transaction based host controller where TDs are processed only when they are marked active.

In any USB system, there is a single master (USB host) who communicates with one or more slave devices (USB devices). Each endpoint communicates in one direction (e.g., an "IN" direction is from a device to the host, and the "OUT" direction is from the host to the device)

In a typical bulk IN endpoint, a USB driver operating under the operating system continuously sends via the host controller bulk data request signals (IN tokens) to the USB device(s). The USB device sends NAK signals unless some bulk data is ready to be transferred by the device. The NAKs cause congestion on the bus, which reduces the time available for the host controller to handshake or receive data from other devices. Because the host controller has to constantly poll the device which keeps sending a NAK signal, the host controller essentially wastes its resources and precious time.

Polling occurs when an ED is enabled, a TD is active or if the TD is loaded and activated for host controller processing.

Although the foregoing description highlights the congestion problem in a USB system, this problem will arise in any communication system that receives NAK signals and uses the polling technique.

Therefore, there is a need for a system that allows efficient polling without wasting precious resources.

SUMMARY OF THE INVENTION

In one aspect of the present invention a process and system is provided for setting up a polling interval for a device that sends a not acknowledged (NAK) signal. The process determines the number of times the device sends a NAK signal before a successful data transfer; and also determines a statistical parameter based on the number of times the NAK signal is received before a successful data transfer; and sets a polling interval for the device based on the statistical parameter. The statistical parameter may be an average, median, maximum or minimum number of times the NAK signal is received before successful data transfer.

In another aspect, the process sets up polling interval for a device that sends a NAK signal non-uniformly. The process sets up a polling interval based upon the number times the NAK signal is received, wherein the polling interval increases with the number of NAK signals. In one aspect, the polling interval doubles after every NAK signal.

In one aspect of the present invention, the host controller does not constantly poll a device that NAKs. This reduces bus congestion and allows the host controller to perform other tasks, in stead of constantly handshaking a device that has been NAKing.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following figures:

FIG. 3 shows a flow diagram of computer-executable process steps for establishing polling intervals for devices that send a NAK signal uniformly; and FIG. 4 shows a flow diagram of computer-executable process steps for establishing polling intervals for devices that send a NAK signal non-uniformly.

DETAILED DESCRIPTION OF THE PREFERRED EMBODIMENTS

Definitions: The following definitions are used in various aspects of the present invention and with respect to the USB specification (but not exclusively):

"ACK": Handshake packet indicating positive acknowledgement.

"Active device": A device that is powered and is not in the Suspend State.

"Bit": A unit of information used by digital computers and represents the smallest piece of addressable memory. Typically represented by a value of one (1) or zero (0).

"Device": A logical or physical entity that performs a function.

"Device Address": A bit value that represents the unique address of a device.

"DMA": Direct Memory Access

"Endpoint": A uniquely addressable portion of a USB device that is the source or sink of information in a communication flow between a host and the device.

"Endpoint Address": Combination of an endpoint number and endpoint direction on a USB device.

"Endpoint Descriptor" ("ED"): Data structure with information necessary for communication between a Host Controller and an endpoint.

"Endpoint Direction": The direction of data transfer, i.e., either "IN" to the host, OR "OUT" from the host.

"Host Controller" ("HC"): Host USB interface.

"Host Controller Driver" ("HCD"): USB software layer that abstracts Host Controller hardware.

"Hub": A USB device that provides additional connection to USB.

"NAK": Handshake packet indicating a negative acknowledgement.

"Packet": A bundle of data organized in-groups for transmission that contains information regarding control, data to be transferred, and error detection and correction bits.

"Polling": Asking multiple devices if they have any data to transmit.

"Queue": A linked list of TDs

"Root Hub": A USB hub directly coupled to the Host Controller.

"Token Packet": A type of packet that identifies the type of transaction that is to be performed.

"Transfer": The delivery of service to an endpoint that includes a token packet, data packet and optional handshake packet.

"Transfer Descriptor" ("TD"): Data structure linked to an endpoint descriptor with transfer information.

"USB": Universal Serial Bus

In one aspect of the present invention, a process is provided in which a receiving system does not poll a transmitting device after every NAK packet is received. Instead, the polling interval is set based on the historical behavior of the transmitting device, or is a function of the NAK frame count in a given connection.

Although the embodiments described below are based on the USB system, the adaptive aspects of the present invention under which a polling interval is set to limit bus congestion may be used effectively in any system that uses the polling technique to monitor for data transfer.

To facilitate an understanding of the preferred embodiment, the general architecture and operation of a computing system will be described first. The specific process under the preferred embodiment will then be described with reference to the general architecture.

Figure 1:
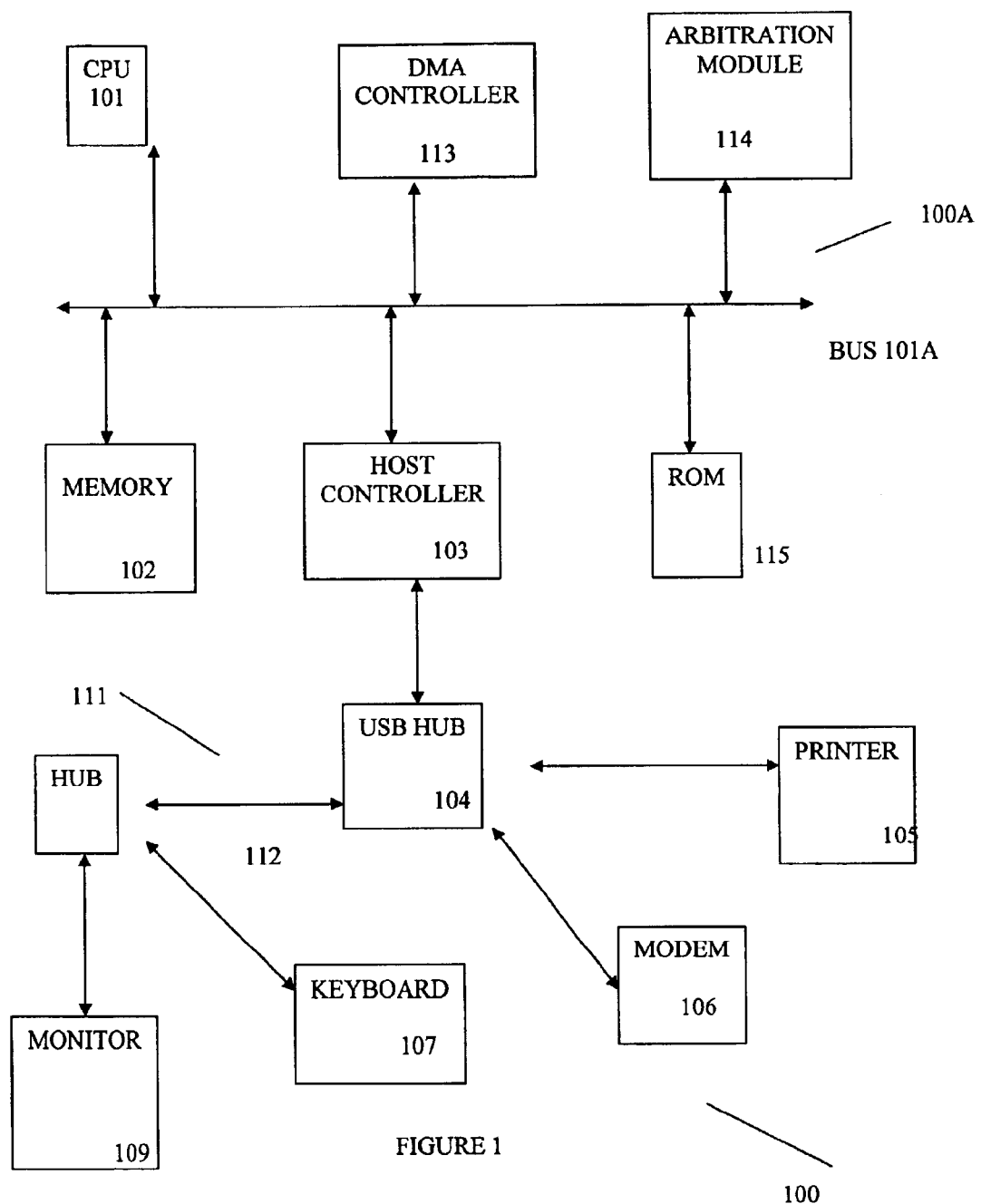
FIG. 1 shows a block diagram of a host system, according to one aspect of the present invention.

FIG. 1 is a block diagram of a USB system 100 with host system 100A connected to plural USB enabled peripheral devices via USB bus 111. Host system 100A may be a personal computer and, although not described in detail, includes a central processing unit (CPU) 101 that may be a Pentium class microprocessor, manufactured by Intel Corp. or any other processor, and further includes volatile and non-volatile storage and input/output devices etc. Host system 100A is provided with a USB controller (Host Controller) 103 for controlling data transfers through bus 111.

All or any part of the foregoing units can be implemented as a computer program including instructions, which are stored on a digital data storage medium such as a magnetic disk or CD-ROM for distribution to end-users in accordance with the present invention. Further, any part of these units can be wholly or partially implemented in volatile memory, non-volatile memory or any combination thereof, prior and during operation.

Plural peripheral units, e.g., printer 105, modem 106, mouse 107, keyboard 108 and monitor 109 may be coupled to host system 100A via USB Root Hub 104.

USB controller 103 communicates with the peripheral units via USB bus 111 using four types of data transfers described above, namely interrupt, control, isochronous, and bulk transfers that are described above. USB bus 111 includes hub 110 coupled with line 112.

Host system 100A includes direct memory access ("DMA") controller 113 that allows access to DMA channels, as discussed below.

DMA controller units are used to perform transfers between memory locations, or between memory locations and an input/output port. DMA controller 113 functions without involving the microprocessor (CPU 101), by initializing control registers in the DMA unit with transfer control information. The transfer control information generally includes source address (the address of the beginning of a block of data to be transferred), the destination address, and the size of the data block. DMA controller 113 provides address and bus control signals to and from a storage device for a read and/or writes cycle.

Specific channels are implemented in DMA controller 113 to allow storage devices to transfer data directly to and from memory storage devices. A channel can be activated by a DMA request signal (DREQ) from a storage device or Host Controller 103 (or 301). DMA controller 113 receives the DREQ, provides a DMA acknowledged signal (DACK), and transfers the data over the channel to or from the storage device.

It is noteworthy that the foregoing system 100A is merely illustrative and is not intended to limit the invention to the foregoing architecture. An embedded system for a cell-phone, and/or hand-held device (Palm Pilot™) may be used to execute the process steps described below.

Figure 2:
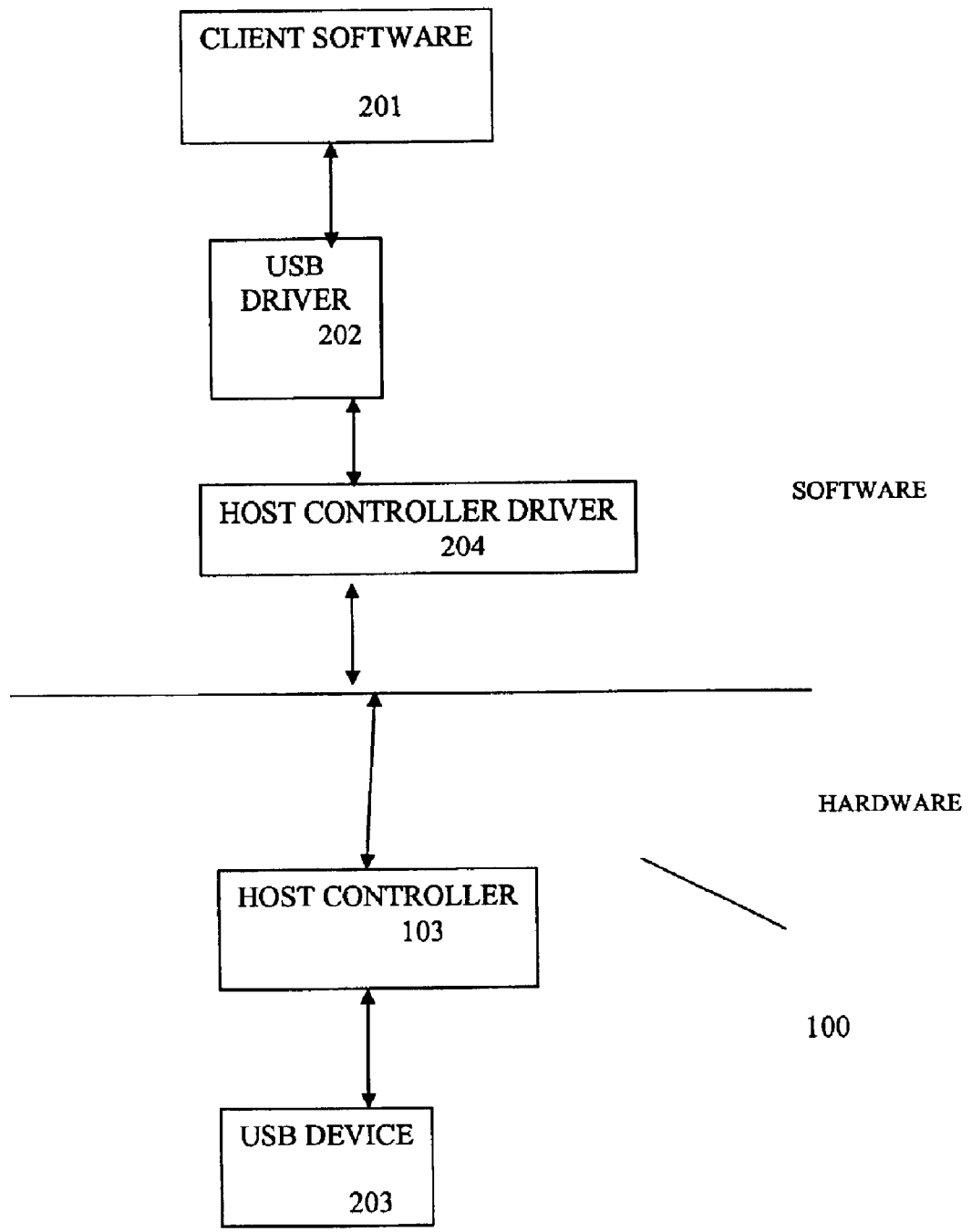
FIG. 2 shows a block diagram of various components of FIG. 1, according to one aspect of the present invention.

FIG. 2 shows another aspect of USB system 100 that uses the various components of FIG. 1. FIG. 2 shows Host Controller Driver 204 and Host Controller 103 that operate in tandem to transfer data between client software 201 and a USB device 203 (which may be any of the USB devices discussed above and shown in FIG. 1).

The present system is adaptive, for example, if OHCI/UHCI compliance is required, then USB Driver 202 includes an OHCI/UHCI driver 204. If OHCI/UHCI compliance is not needed (.e.g. in embedded systems) a modified Host Controller Driver 202 is used with USB driver 202.

FIG. 3 shows a flow diagram of computer-executable process steps for establishing polling intervals for devices that NAK in a uniform manner. In one aspect of the present invention, a historical range of values (or a single value) is built that records the average number of times a device NAKs before successfully transferring (or receiving) data. Based on the historical information, threshold value(s) are associated with the device. The threshold determines the polling time interval when the host will poll the device for data after receiving a NAK from the particular device.

Turning in detail to FIG. 3, in step S300, a NAK packet is received from a device. In one aspect, in a USB system 100A, host controller 103 receives a NAK packet from USB device 203 (e.g. printer 105). Typically, host controller 103 has a buffer (not shown), where the NAK packet is received. It is noteworthy that a NAK packet may be received in any system, and the USB system, herein, is used to illustrate the adaptive aspects of the present invention.

In step S301, the counting for the NAK packet is started. In one aspect host controller 103 starts counting NAK packets. One skilled in the art can appreciate that the invention is not limited to host controller 103 counting the NAK packets, any other component in host system 100A may count the NAKs.

In step S302, the number of NAKs before successful data transfer is recorded. In one aspect of the present invention, host controller 103 records the number of NAKs received, prior to successful data transfer.

Steps S300–S302 are repeated N times (here N is positive integer) so that in step S303, the average number of NAKs (or attempts for successful data transfer) may be ascertained for the N instances. Host controller 103 may compute the average number of NAKs or attempts that are made before successful data transfer.

In step S304, polling interval "T" is established for a particular device based on the average number of attempts required for successful data transfer. It is noteworthy that the adaptive aspects of the present invention are not limited to the average number of NAKs (or attempts), but instead, the median, maximum, minimum or any other statistical value may be used to set the polling interval.

The polling interval T is device specific. In a USB system, the ED of an endpoint may be tagged to indicate the polling interval T. For example, when host controller 103 receives a NAK from printer 105, it knows the polling interval based on previous historical data. This indicates to host controller 103 when to poll printer 105, after it receives the first NAK.

The foregoing discussion is based on a device that NAKs uniformly, however there are devices that do not NAK uniformly, for example, communication devices (modem 106). In this case using a polling interval based on historical data alone may not be enough, because data transfer depends on various factors, including network connection and speed of the host system.

FIG. 4 provides a flow diagram of computer-executable steps to establish a polling interval where NAK packets are not received uniformly. In this case the polling interval is scaled and is based on the number of received NAK frames at a given time, rather than based on historical average.

Turning in detail to FIG. 4, in step S400, the first NAK packet is received. In one aspect of the present invention, host controller 103 handshakes the NAK packet and polls the device that sent the NAK packet.

In step S401, the polling interval is set. In one aspect the polling interval is set as follows:

If NAKframe count is >1 then the time until the next retry (or poll) is: NAKframe count*M Where M is positive integer and does not exceed a value P. In one aspect of the present invention, M may be equal to 2 and P is 64. In this instance, host controller 103 doubles the polling interval for every NAK packet, except that the polling time does not exceed 64 milliseconds.

In one aspect of the present invention, the FIG. 4 process steps may be combined with the process steps of FIG. 3. For example, a polling interval may be established based on historical data for devices that send NAK non-uniformly and then adjusted using the process step S401.

In one aspect of the present invention, the host controller 103 does not constantly poll a device that NAKs. This reduces bus congestion and allows the host controller 103 to perform other tasks, in stead of constantly handshaking a device that has been NAKing.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method in a computing system for setting up a polling interval for a device that sends a not acknowledged (NAK) signal, comprising:

determining the number of times the device sends a NAK signal before a successful data transfer;

determining a statistical parameter based on the number of times the NAK signal is received before a successful data transfer; and setting a polling interval for the device based on the statistical parameter.

2. The method of claim 1, wherein the statistical parameter is an average number of times the NAK signal is received before successful data transfer.

3. The method of claim 1, wherein the statistical parameter is the median of the number of times the NAK signal is received before successful data transfer.

4. The method of claim 1, wherein the statistical parameter is the maximum number of times the NAK signal is received before successful data transfer.

5. The method of claim 1, wherein the statistical parameter is the minimum number of times the NAK signal is received before successful data transfer.

6. A method in a computing system for setting up a polling interval for a device that sends a not acknowledged (NAK) signal non-uniformly, comprising:

setting up a polling interval based upon the number times the NAK signal is received, wherein the polling interval increases with the number of NAK signals.

7. The method of claim 6, wherein the polling interval doubles after every NAK signal.

8. A computer-readable medium storing computer-executable process steps of a process in a computing system for setting up a polling interval for a device that sends a not acknowledged (NAK) signal, comprising:

determining the number of times the device sends a NAK signal before a successful data transfer;

determining a statistical parameter based on the number of times the NAK signal is received before a successful data transfer; and setting a polling interval for the device based on the statistical parameter.

9. The computer-readable medium of claim 8, wherein the statistical parameter is an average number of times the NAK signal is received before successful data transfer.

10. The computer-readable medium of claim 8, wherein the statistical parameter is the median of the number of times the NAK signal is received before successful data transfer.

11. The computer-readable medium of claim 8, wherein the statistical parameter is the maximum number of times the NAK signal is received before successful data transfer.

12. The computer-readable medium of claim 8, wherein the statistical parameter is the minimum number of times the NAK signal is received before successful data transfer.

13. A computer-readable medium storing computer-executable process steps of a process in a computing system for setting up a polling interval for a device that sends a not acknowledged (NAK) signal non-uniformly, comprising:

setting up a polling interval based upon the number times the NAK signal is received, wherein the polling interval increases with the number of NAK signals.

14. The computer-readable medium of claim 13, wherein the polling interval doubles after every NAK signal.

15. Computer-executable process steps in a computing system for setting up a polling interval for a device that sends a not acknowledged (NAK) signal, comprising:

determining the number of times the device sends a NAK signal before a successful data transfer;

determining a statistical parameter based on the number of times the NAK signal is received before a successful data transfer; and setting a polling interval for the device based on the statistical parameter.

16. Computer-executable process steps of claim 15, wherein the statistical parameter is an average number of times the NAK signal is received before successful data transfer.

17. Computer-executable process steps of claim 15, wherein the statistical parameter is the median of the number of times the NAK signal is received before successful data transfer.

18. Computer-executable process steps of claim 15, wherein the statistical parameter is the maximum number of times the NAK signal is received before successful data transfer.

19. Computer-executable process steps of claim 15, wherein the statistical parameter is the minimum number of times the NAK signal is received before successful data transfer.

20. Computer-executable process steps in a computing system for setting up a polling interval for a device that sends a not acknowledged (NAK) signal non-uniformly, comprising:

setting up a polling interval based upon the number times the NAK signal is received, wherein the polling interval increases with the number of NAK signals.

21. Computer-executable process steps of claim 20, wherein the polling interval doubles after every NAK signal.

22. A system for setting up a polling interval for a device that sends a not acknowledged (NAK) signal, comprising:

a host controller for determining the number of times the device sends a NAK signal before a successful data transfer;

determining a statistical parameter based on the number of times the NAK signal is received before a successful data transfer; and setting a polling interval for the device based on the statistical parameter.

23. The system of claim 22, wherein the statistical parameter is an average number of times the NAK signal is received before successful data transfer.

24. The system of claim 22, wherein the statistical parameter is the median of the number of times the NAK signal is received before successful data transfer.

25. The system of claim 22, wherein the statistical parameter is the maximum number of times the NAK signal is received before successful data transfer.

26. The system of claim 22, wherein the statistical parameter is the minimum number of times the NAK signal is received before successful data transfer.

27. A system for setting up a polling interval for a device that sends a not acknowledged (NAK) signal non-uniformly, comprising:

a host controller for setting up a polling interval based upon the number times the NAK signal is received, wherein the polling interval increases with the number of NAK signals.

28. The system of claim 27, wherein the polling interval doubles after every NAK signal.

* * * * *